(12) United States Patent
Spalding et al.

(10) Patent No.: US 11,010,780 B2
(45) Date of Patent: May 18, 2021

(54) COMPUTER-IMPLEMENTED APPLICATION FOR BRICK AND MORTAR FLASH SALES

(71) Applicant: Raise Marketplace Inc., Chicago, IL (US)

(72) Inventors: Tyler Robert Spalding, Chicago, IL (US); Alven Diaz, Chicago, IL (US); Rodney Yates, Chicago, IL (US); Milo Todorovich, Libertyville, IL (US)

(73) Assignee: Raise Marketplace Inc., Chicago, IL (US)

( * ) Notice: Subject to any disclaimer, the term of this patent is extended or adjusted under 35 U.S.C. 154(b) by 514 days.

(21) Appl. No.: 14/952,183

(22) Filed: Nov. 25, 2015

(65) Prior Publication Data

US 2016/0189191 A1 Jun. 30, 2016

Related U.S. Application Data

(63) Continuation-in-part of application No. 14/865,293, filed on Sep. 25, 2015, now Pat. No. 10,832,298.

(60) Provisional application No. 62/222,035, filed on Sep. 22, 2015, provisional application No. 62/085,354, filed on Nov. 28, 2014.

(51) Int. Cl.
*G06Q 30/00* (2012.01)
*G06Q 30/02* (2012.01)

(52) U.S. Cl.
CPC ..... *G06Q 30/0222* (2013.01); *G06Q 30/0251* (2013.01); *G06Q 30/0276* (2013.01)

(58) Field of Classification Search
CPC .......... G06Q 30/0222; G06Q 30/0251; G06Q 30/0276

USPC .................................. 705/26.35, 14, 26, 27
See application file for complete search history.

(56) References Cited

U.S. PATENT DOCUMENTS

| 8,525,665 | B1 * | 9/2013 | Trundle ............. | G08B 21/0423 |
| | | | | 340/517 |
| 9,288,242 | B2 * | 3/2016 | Van Wie ................. | H04W 4/50 |
| 9,542,691 | B1 * | 1/2017 | Herman ............. | G06Q 30/0226 |

(Continued)

OTHER PUBLICATIONS

Cyber Apps World (OTCBB: CYAP) Confirms Marketing/Licensing Agreement With Instant Coupon App for Marketing on Their Proprietary E-Commerce Network Internet Wire Jun. 2, 2015, Dialog #416210901, 2pgs. (Year: 2015).*

*Primary Examiner* — Robert M Pond
(74) *Attorney, Agent, or Firm* — Garlick & Markison; Timothy W. Markison

(57) ABSTRACT

A method includes receiving, by a warehouse server, flash sale data file from a retail-type server. The method further includes storing, by the warehouse server, the flash sale data file in a database that functions as a virtual warehouse of flash sales. The method further includes interpreting, by the warehouse server, the information of the flash sale data file to determine flash sale parameters. The method further includes determining, by the warehouse server, whether a computing device has customer-device data that corresponds to the flash sale parameters. The method further includes, when the computing device has the customer-device data that corresponds to the flash sale parameters, generating, by the warehouse server, a customer specific coupon regarding the flash sale. The method further includes transmitting, by the warehouse server, the customer specific coupon to the computing device.

12 Claims, 8 Drawing Sheets

(56) References Cited

U.S. PATENT DOCUMENTS

| | | | |
|---|---|---|---|
| 2002/0143655 A1* | 10/2002 | Elston | G06Q 20/02 705/26.81 |
| 2003/0154125 A1* | 8/2003 | Mittal | G06Q 30/02 705/14.23 |
| 2005/0209921 A1* | 9/2005 | Roberts | G06Q 30/02 705/14.13 |
| 2006/0271552 A1* | 11/2006 | McChesney | G06Q 30/02 |
| 2010/0162149 A1* | 6/2010 | Sheleheda | A63F 13/12 715/764 |
| 2011/0029364 A1* | 2/2011 | Roeding | G01S 5/18 705/14.16 |
| 2011/0238505 A1* | 9/2011 | Chiang | G06Q 30/00 705/14.69 |
| 2012/0226540 A1* | 9/2012 | Batalion | G06Q 30/06 705/14.23 |
| 2012/0290375 A1* | 11/2012 | Truong | G06Q 30/0207 705/14.17 |
| 2013/0013389 A1* | 1/2013 | Vitti | G06Q 30/0207 705/14.35 |
| 2013/0046595 A1* | 2/2013 | Wu | G06Q 30/06 705/14.21 |
| 2013/0254007 A1* | 9/2013 | Cockcroft | G06Q 30/02 705/14.25 |
| 2013/0325705 A1* | 12/2013 | Laird | G06Q 30/0207 705/39 |
| 2013/0339124 A1* | 12/2013 | Postrel | G06Q 30/0233 705/14.33 |
| 2014/0297392 A1* | 10/2014 | Moffitt | G06Q 30/0238 705/14.38 |
| 2015/0073906 A1* | 3/2015 | Chauhan | H04W 4/029 705/14.58 |
| 2015/0161643 A1* | 6/2015 | Randell | G06Q 30/0261 705/14.26 |
| 2015/0310490 A1* | 10/2015 | Meredith | H04W 4/021 705/14.58 |
| 2016/0196596 A1* | 7/2016 | Van Wie | H04N 7/157 705/26.41 |

* cited by examiner

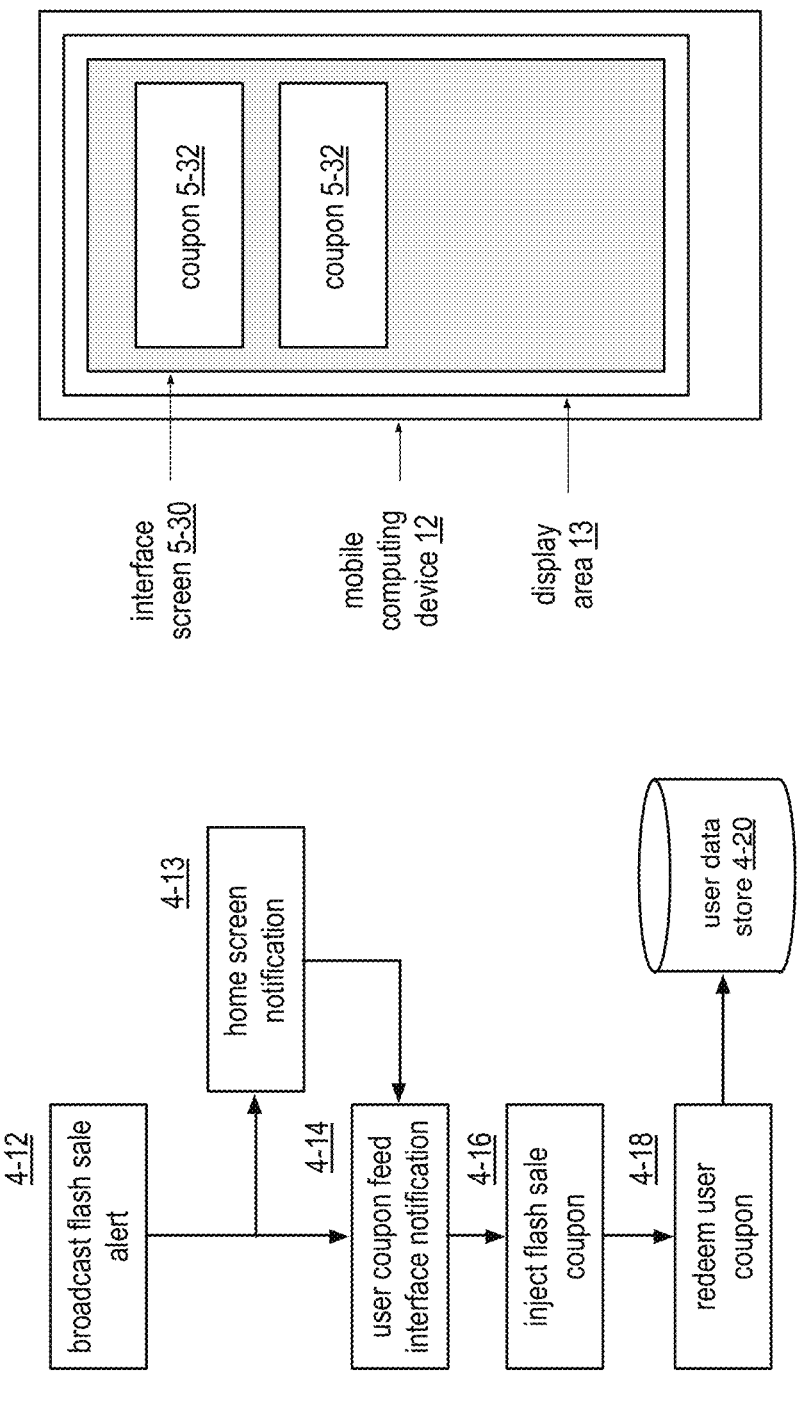

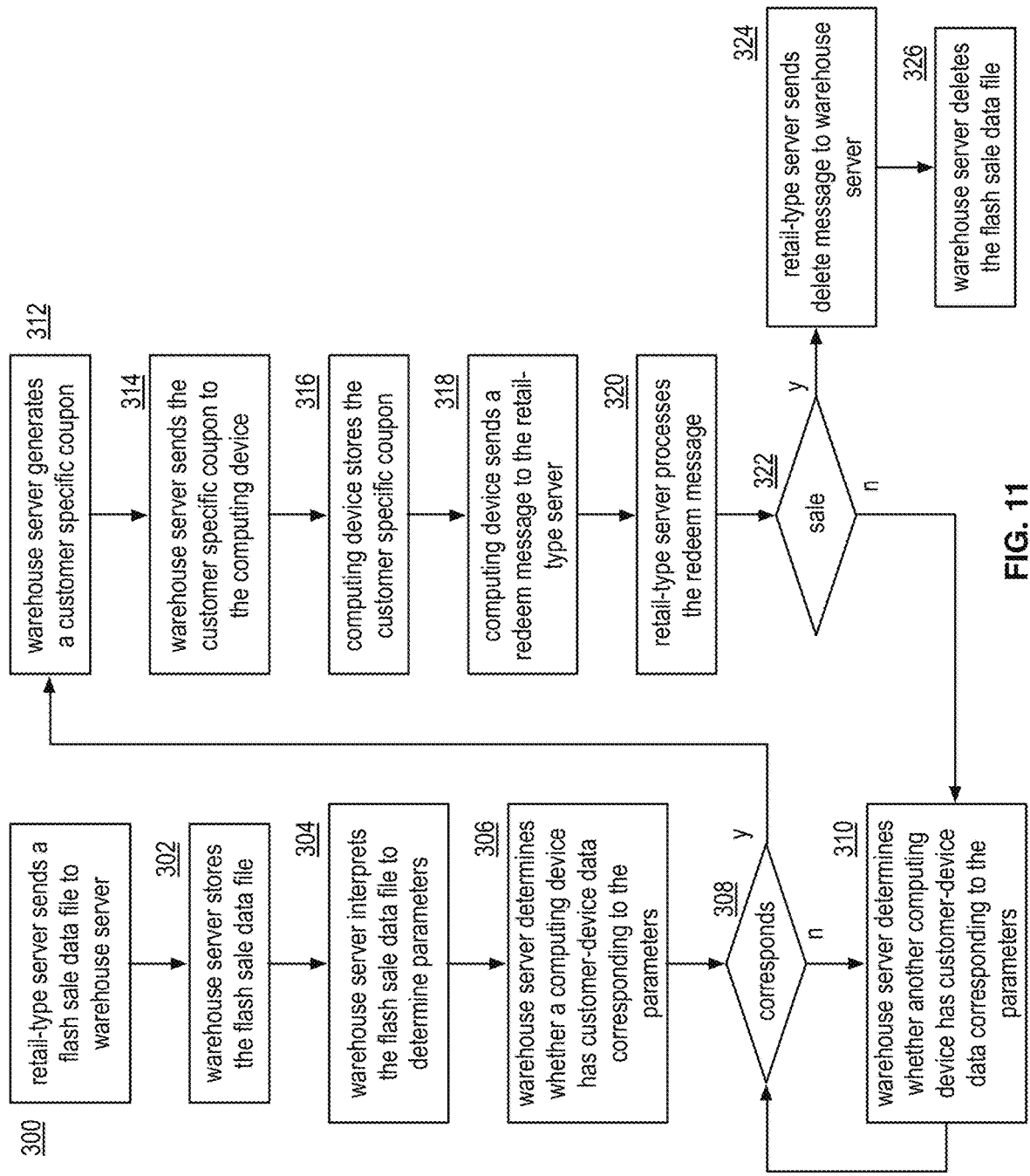

COMPUTER-IMPLEMENTED APPLICATION FOR BRICK AND MORTAR FLASH SALES

CROSS REFERENCE TO RELATED PATENTS

The present U.S. Utility patent application claims priority pursuant to 35 U.S.C. § 119(e) to U.S. Provisional Application No. 62/085,354, entitled "COMPUTER-IMPLEMENTED APPLICATION FOR BRICK AND MORTAR FLASH SALES", filed Nov. 28, 2014, which is hereby incorporated herein by reference in its entirety and made part of the present U.S. Utility patent application for all purposes.

The present U.S. Utility patent application also claims priority pursuant to 35 U.S.C. § 120 as a continuation-in-part of U.S. Utility application Ser. No. 14/865,293, entitled "METHOD AND APPARATUS FOR AN EXCHANGE ITEM MARKETPLACE NETWORK", filed Sep. 25, 2015, which claims priority pursuant to 35 U.S.C. § 119(e) to U.S. Provisional Application No. 62/222,035, entitled "METHOD AND APPARATUS FOR AN EXCHANGE ITEM MARKETPLACE NETWORK", filed Sep. 22, 2015, both of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

The present invention relates to mobile applications to promote sales. More particularly, the present invention relates to mobile applications to allow physical brick and mortar stores to leverage digital alerts to create flash sales in real-time.

2. Description of Related Art

"Flash sales" are discounts offered by retailers that last for only a short amount of time. The flash sales may only last for a few hours, minutes, or even seconds, depending on various factors including, but not limited to, the popularity of the product, the available quantity, and the discount amount. Some flash sales can have discounted prices up to 90% off of the retail price.

Flash sales are typically offered on the Internet. An online retailer will put a product for sale (with limited quantity) at a major discount for a limited time. Online retailers will generally send an email to its subscriber list to advertise the sale and the time urgency to make a purchase. Current flash sale approaches, however, are unable to direct alerts to prospective customers in close physical proximity (e.g., within a store).

BRIEF DESCRIPTION OF THE SEVERAL VIEWS OF THE DRAWING(S)

FIG. 4 is a diagram of an overview of the mobile application in accordance with the present invention;

FIG. 5 is an example of a screen shot of a coupon feed user interface of the mobile application in accordance with the present invention;

FIG. 11 is a logic diagram of an embodiment of a method for flash sale offerings in accordance with the present invention.

DETAILED DESCRIPTION OF THE INVENTION

Figure 1:
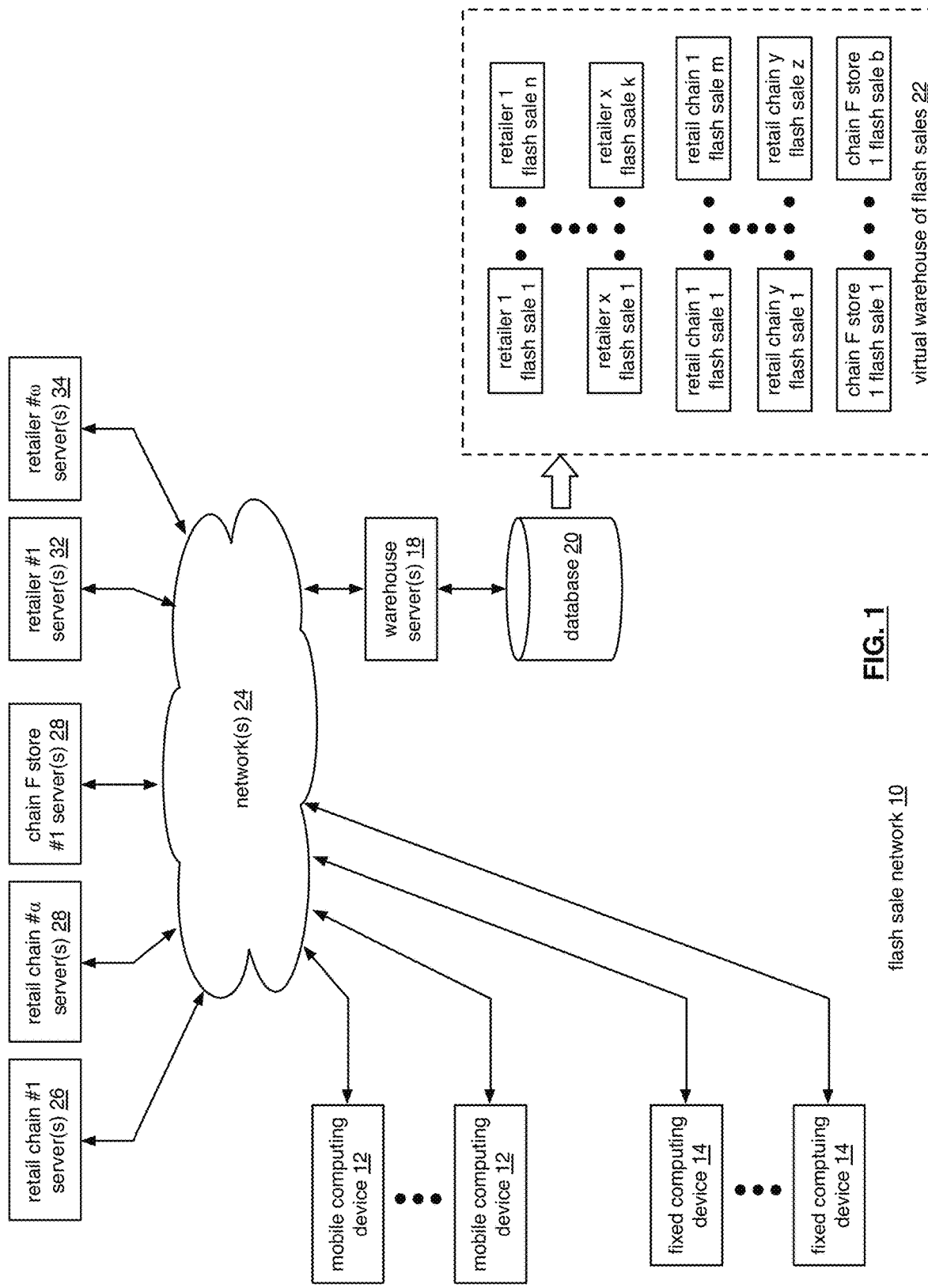
FIG. 1 is a schematic block diagram of a flash sale network in accordance with the present invention.
Figure 3:
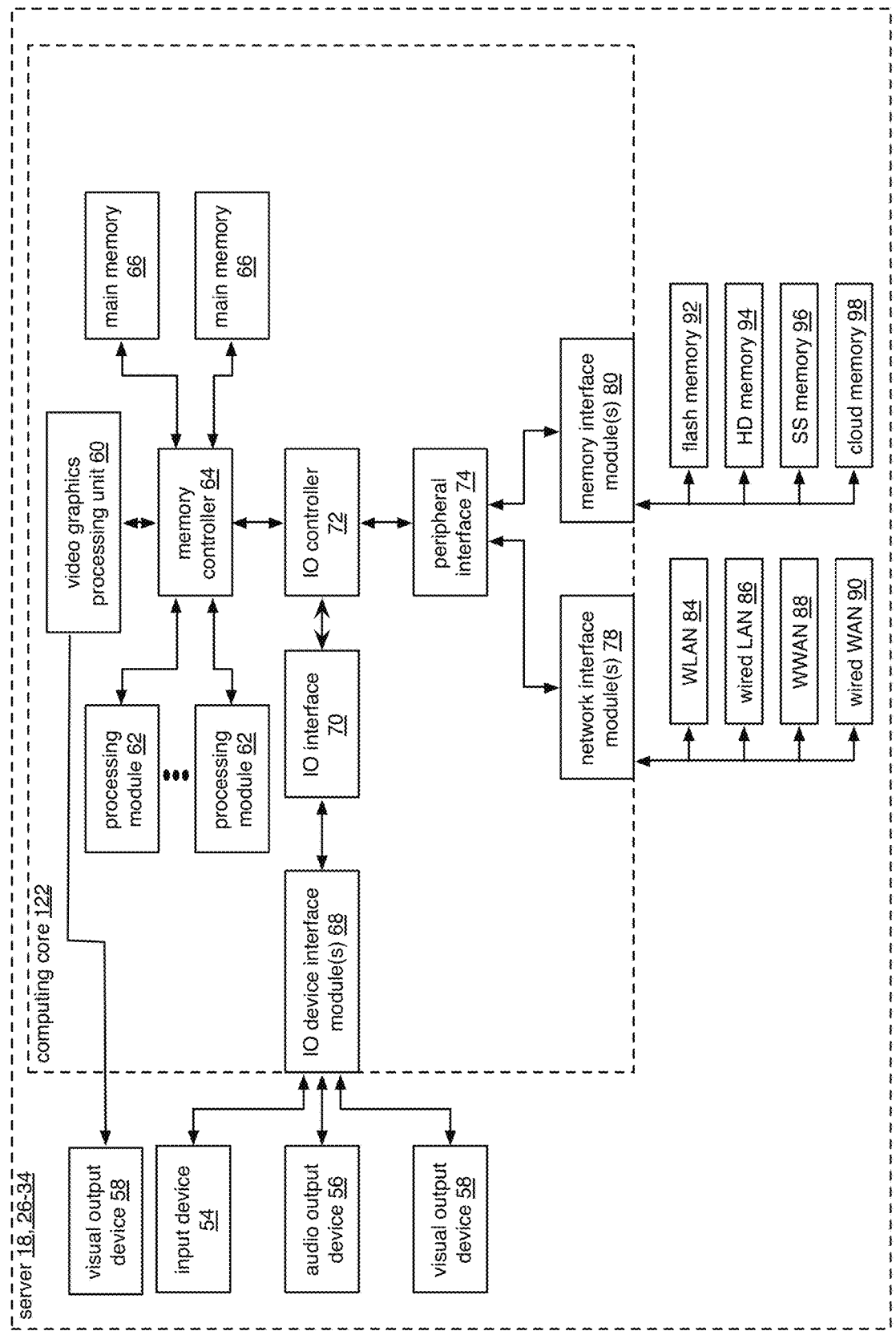
FIG. 3 is a schematic block diagram of a server in accordance with the present invention.

FIG. 1 is a schematic block diagram of an embodiment of a flash sale network 10 that includes mobile computing devices 12, fixed computing devices 14 of bulk, one or more warehouse servers 18 (an example embodiment is shown in FIG. 3), one or more databases 20, one or more networks 24, a plurality of retail chain servers (e.g., one or more retail chain servers 26 for retail chain #1 through one or more retail chain servers 28 for retail chain #α), a plurality of chain store servers (e.g., one or more chain store servers 30 for chain store #F), and a plurality of retailer servers (e.g., one or more retailer servers 32 for retailer #1 through one or more retailer servers 34 for retailer #ω). The one or more warehouse servers 18 process, and the one or more databases 20 store, a virtual warehouse of flash sales 22.

Each of the computing devices 12 and 14 includes a computing core. In general, a computing device is any electronic device that can communicate data, process data, and/or store data. A further generality of a computing device is that it includes a central processing unit (CPU), a memory system, user input/output interfaces, peripheral device interfaces, and an interconnecting bus structure.

As specific examples, a mobile computing device 12 may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device 14 may be a personal computer (PC), a computer server, a cable set-top box, a satellite receiver, a television set, a printer, a fax machine, home entertainment equipment, a video game console, and/or any type of home or office computing equipment that includes a computing core. An embodiment of a computing device 12-14 is further described below with reference to FIG. 2.

The flash sale network 10 supports the posting and usage of flash sales from vendors to specific customers. In support of posting a flash sale, the warehouse server 18 receives a flash sale data file from one or the retail-type servers (e.g., any one of servers 26-34). The flash sale data file includes information regarding identity of merchandise that is a subject of a flash sale (e.g., shoes, boots, a specific hand bag, etc.), a duration of the flash sale (e.g., for the next five minutes, from 2 PM to 3 PM on a specific date, etc.), one or restrictions of the flash sale (only valid for use in a specific store, not valid with other offers, etc.), identity of one or more targeted customers (e.g., a specific customer, a group of customers, customers that fit a particular profile, etc.), and geographic proximity parameters (e.g., in a specific store, in a mall that includes the specific store, within x miles of the specific store, etc.).

The warehouse server 18 verifies the retail-type server by verifying one or more of the retailer's name, the retailer's account, a retailer's personal identification number (PIN), a retailer's identification number (ID), a retailer's payment account information (e.g., a credit card number, checking or savings account information), the retailer's mailing address, etc. In addition, the warehouse server 18 may further verify information regarding the particular server such as the server's IP address, the server's serial number, the server's warehouse network ID, etc.

When the retail-type server is verified, the warehouse server 18 posts the flash sale data file in the virtual warehouse of flash sales 22, which is stored in database 20. In one example embodiment, the warehouse server 18 creates a digital representation of the flash sale data file and/or a digital representation of a coupon regarding the flash sale. The digital representation of the flash sale is displayed within a grouping per the organization protocol of the flash sale network 10. For example, the flash sale may be organized by retailer name, by retailer type (e.g., sporting goods, women's fashion, etc.), by the type of merchandize that is the subject of the flash sale, by time that the flash sale is valid, etc.

Customers associated with the computing devices 12 and 14 may receive a flash sale coupon in a variety of ways. For example, a consumer, via its computing device, accesses the virtual warehouse of flash sales 22 to identify a flash sale of interest. The computing device 12 or 14 sends a request to acquire the flash sale coupon to the warehouse server 18 or to the retail-type server associated with the flash sale. The receiving server (e.g., warehouse server 18 or retail type server 26-34) determines whether this customer-computing device is allowed to receive the coupon. For example, the server determines whether the computing device has customer-device data (e.g., information regarding the customer and/or information regarding the computing device) that corresponds to the flash sale parameters (e.g., information regarding targeted consumers, in store use requirements, etc.).

If the customer is allowed to receive the flash sale coupon, the warehouse server 18 sends a digital representation of the coupon to the computing device 12 or 14. The warehouse server 18 then determines whether the flash sale is still valid for other consumers (e.g., was this flash sale only for the one customer, all designated customers have retrieved the coupon, time expired, etc.). If the flash sale is still valid, the warehouse server 18 maintains the digital representation of the flash sale (or coupon) in the database 20. If the flash sale is no longer valid, the warehouse server 18 deletes the digital representation of the flash sale from the virtual warehouse of flash sales 22. The server 18 may archive the flash sale data file or delete it.

As another example, a customer, via its computing device 12 or 14, may receive a notification of the flash sale from the warehouse server 18 and/or the retail-type server 26-34. In this example, the server interprets the flash sale data file to identify particular customers, restrictions of the flash sale, the merchandize being offered for the flash sale, and/or any other relevant information regarding the flash sale and/or the targeted customers. The server then determines whether a computer device of a targeted customer meets the parameters of the flash sale (e.g., is the identified customer, is in a group of identified customer type, is a customer likely to buy the merchandize, is in the store, is in a mall containing the store, is within x miles of the store, etc.)

If so, the server sends the computing device 12 or 14 notification of the flash sale. If the customer is interested in the flash sale, the computing device sends a request for the flash sale coupon to the server. The server then sends the digital coupon to the computing device.

The computing device 12 or 14 then executes a purchase of the merchandize using the coupon, which is processed by the retail type server. For instance, the retail type server verifies the identity of the consumer, the computing device, and/or any other authenticating information. When verified, the retail type server then verifies if the coupon is still valid for this particular customer. If so, the purchase is processed using the coupon. The retail type server then determines if this is the last use of the coupon (e.g., this was the only customer for the coupon, all designated customers have used the coupon, a number of uses have been met, time has expired, etc.). If so, the retail type server sends a delete message to the warehouse server 18. The warehouse server 18 deletes the flash sale data file from the active database 20, but may keep an archive copy.

Figure 2:
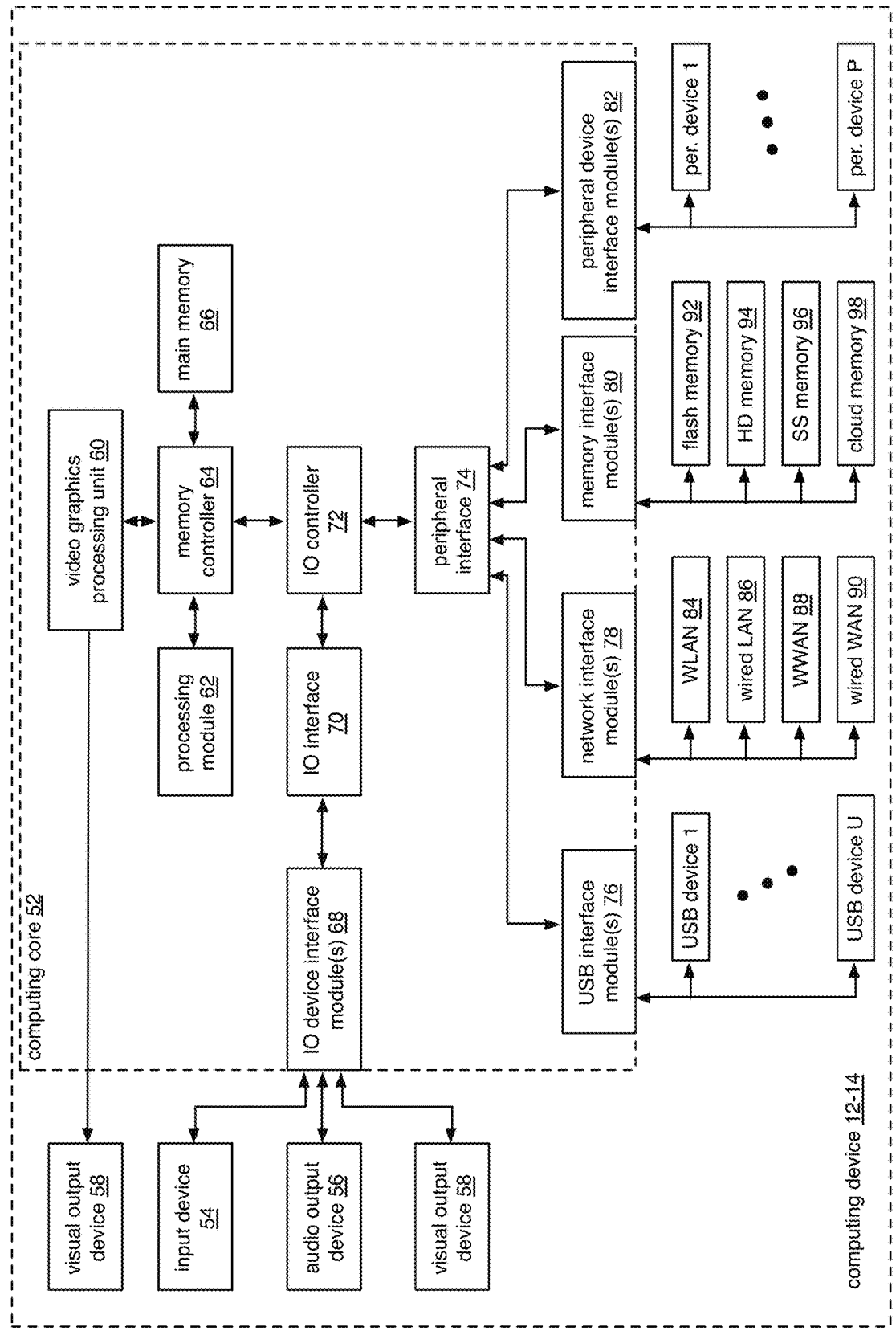
FIG. 2 is a schematic block diagram of a computing device in accordance with the present invention.

FIG. 2 is a schematic block diagram of an embodiment of computing device 12-14. The computing device 12-14 includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface module 68, an input/output (I/O) interface 70, an input/output (I/O) controller 72, a peripheral interface 74, one or more USB interface modules 76, one or more network interface modules 78, one or more memory interface module 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the IO device interface modules 68 couples to an audio output device 56. As another example, one of the memory interface modules 60 couples to flash memory 93 and another one of the memory interface modules 60 couples to cloud memory 98 (e.g., an on-line storage system and/or on-line backup system).

FIG. 3 is a schematic block diagram of an embodiment of a server 18, 26-34 that includes a computing core 122, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices. Note that the server 18 may include more or less devices than shown in this example embodiment of a server.

The computing core 122 includes a video graphics processing unit 60, a plurality of processing modules 62, a memory controller 64, a plurality of main memories 66 (e.g., RAM), one or more input/output (I/O) device interface module 68, an input/output (I/O) interface 70, an input/output (I/O) controller 72, a peripheral interface 74, one or more network interface modules 78, and/or one or more memory interface module 80.

FIG. 4 illustrates the operation of the mobile application 4-10 associated with the network 10. The mobile application 4-10 allows physical stores, including entire malls and shopping centers, to digitally send "flash sale" offers to consumers. The application allows the offers to be targeted to specific individuals based on a variety of data.

In one embodiment, for a flash sale alert 4-12 is to be transmitted to a mobile device (e.g., a mobile computing device 12), a consumer first downloads the mobile application and then specifies a desire to receive flash sale offers from retailers and/or retail chains. The alerts can be personalized to each consumer, and include specific features such as time expiration, location sensitivity, and "redemption" at a store.

As an example of use for this embodiment, the application 4-10 generates and broadcasts a flash sale alert 4-12. The application 4-10 transmits the flash sales alert 4-12 based upon various selectable criteria including, among others, user location. The flash sale alert 4-12 may be customized by the retailer operating the application 4-10. If a user does not have the application 4-10 immediately available on the screen of the consumer's mobile device, the application 4-10 will create a home screen notification 4-13 where the flash sale alert 4-12 is published on the home screen of the user's mobile device. When the user has the application 4-10 active, it receives a coupon notification via a feed notification interface 4-14.

The application then injects a flash sale coupon 4-16. For example, the mobile device of the customer receives a digital representation of the coupon, which it stores. Within the restrictions of the flash sale, the consumer redeems the coupon via its mobile device 4-18. The transaction is then recorded in a user database 4-20.

FIG. 5 illustrates an example of a coupon feed interface screen 5-30 of the application 4-10. The coupon feed interface screen 5-30 displays one or more coupons 5-32 for consideration by the user. The mobile device may receive and display a stream of coupons 5-32 from a variety of stores, retail chains, malls, shopping centers and/or other similar aggregation.

Figure 6:
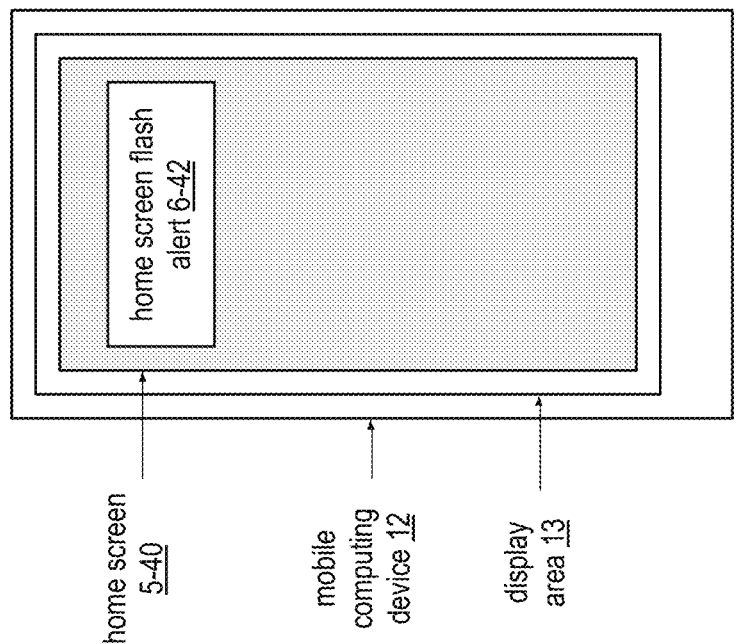
FIG. 6 is an example of a screen shot of a home screen interface of the mobile application in accordance with the present invention.

FIG. 6 illustrates an example of a home screen 5-40 of a user's mobile device. In this scenario, the user does not have the application 4-10 open and displayed on the screen of his or her mobile device. In this case, the application 4-10 transmits and displays a home screen flash alert 6-42 on the mobile device home screen. From the home screen 5-40, the user can interact with the home screen flash alert 6-42 to open application 4-10.

Figure 7:
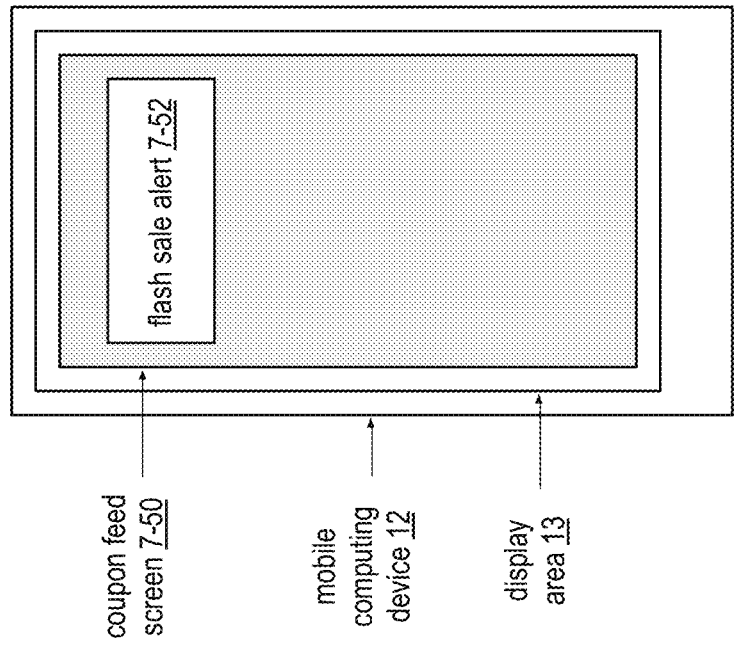
FIG. 7 is an example of a screen shot of the sales flash alert and notification user interface of the mobile application in accordance with the present invention.

FIG. 7 illustrates an example of a version of a coupon feed interface screen 7-50 including a flash sale alert 7-52. Where the user is actively using the application 4-10 on his or her mobile device, the application 4-10 will create a user coupon feed interface notification. The application will then inject a flash sale coupon 7-52 at the top of the coupon feed interface 7-50 displayed to the user. The user can elect to click on the flash shale coupon 7-52 to trigger a redemption opportunity.

Figure 8:
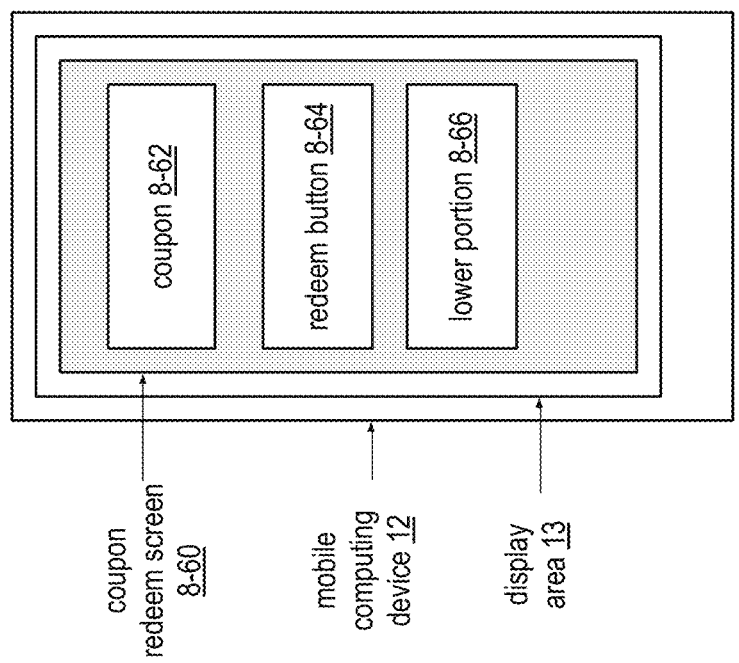
FIG. 8 is an example of a screen shot of the coupon redemption user interface of the mobile application in accordance with the present invention.

FIG. 8 illustrates an example of a coupon redemption screen 8-60. The redemption screen includes a coupon 8-62, a "Redeem" button 8-64 and lower portion 8-66 providing additional information concerning the current flash sale offer. Once the user receives the flash sales alert, the user can elect to proceed to the retail brick and mortar store to redeem the current flash sale alert coupon 8-62. Once the user is inside the store at the point of sale, the user can click into the coupon 8-62 and press the "Redeem" button 8-64. The application 4-10 will then confirm the validity of the offer and authorize the coupon 8-62.

The application 4-10 allows the store to track the redemption of the flash sale alert coupon and all associated and available data associated with the consumer. The data collected from the use of the flash sale coupon by the consumer is transmitted to a user data store for updating the consumer's purchase profile and history. The user data is subsequently processed to perform analytics to benefit the retailer of the brick and mortar store.

The system also allows flash sales to be customized for amount of savings and product type based on the profile of each consumer. Example data that can be used in calculating an offer associated with a flash sale alert includes: consumer's previous interactions with the application, including identified favorite products/brands, location, shopping habits, store/mall visits, purchases, specific store visits, duration of visit, which stores not visited, brand affinity, social sharing history, rewards points, and coupon redemptions. The timing and duration of the offers can also be personalized.

In another version, the application provides an administrative dashboard on a point of sale system or other computer such that an authorized mall/store employee can access and target a flash sale to a specific customer or group of customers on demand.

The flash sales alerts can be timed in advance or triggered automatically based on pre-determined events or business logic. For a triggered event, the application will check to see if any offers are available for a particular consumer based on a certain action or location event. Flash sales are alerted to users via push notifications and in-application messages. Each flash sale alert and associated coupon will be displayed within the main portion of the mobile application.

In addition to flash sale alerts, other alerts are distributed through the application on a mobile device, in another version, the application can generate Internet-based interstitial pages when connecting to a local wireless network. For example, when someone connects to the Internet at a particular retail location, a flash sale alert would display as a pop-up page. A flash sale alert could also be included within a social media feed. For example, if someone browses a social media host while onsite at a store location, the flash sale alert would show up in the sponsored advertising section of social media host. Again, the flash sale alert would be driven based on location and preference data, or other criteria.

Triggering events, which lead to the generation of a flash sale alert, can be based on geographic location, including proximity to a store location. Consumer location can be determined using GPS, wireless internet access points, Bluetooth beacon signals and other location-based tracking technology. Location can be determined at the mall, shopping center or store level. Within stores, location may also be determined within individual sections of the store. The application provides functionality to allow flash sale alerts to be targeted to consumers physically at or near the retail location, or off-site.

Redeeming coupons associated with each flash sale alert can require location services enabled via Bluetooth beacons, GPS, or other alternative location tracking technologies. For a customer to use a flash sale offer and receive the discount, the customer must confirm that he or she is physically at the store by interacting with local Bluetooth devices, or transmitting location information within the application. Other presence sensing devices may be used in association with the application to confirm the presence of the consumer at a required location.

In another version, the flash sale alert coupon does not need to be redeemed in the store itself. Instead, although the offer is triggered by various events and criteria, primarily including near geographic proximity to a store, as long as the consumer satisfies constraints associated with the offer, e.g., time expiration, the consumer could be allowed to redeem the coupon via the phone or Internet.

The flash sale application delivers functionality, for example, at a separate computing device or the store's point-of-sale system, to allow a store or mall employee to drive flash alerts based upon various criteria. For example, the store or mall employee could, using the application data store, identify ten highly valuable customers with a brand affinity for a certain shoe. That employee could then send flash sale alerts and associated digital coupons ("flash sales") and corresponding push notifications only to the ten highly valuable customers. The alert would state the restrictions associated with the offer, for example, stating that the flash sale is valid for only the next half hour, or the next day. Those customers would then come to the store and redeem the coupon at a point of sale location (like the checkout counter) where a location proximity device, such as a Bluetooth beacon is stationed. The coupon is redeemed, the consumer receives the offered discount and then the coupon vanishes from the application on the consumer's mobile device. The flash sale coupon would no longer be available after redemption.

In other scenarios, where data is available through the application, the application can be operated by an employee to target a customer who is visiting the store for the first time. Since the application may have collected data from the consumer's purchasing behavior at other brick and mortar stores, the consumer can be targeted with a push notification based on that previous shopping behavior.

The application allows each flash sale coupon to be adapted based on the specific person receiving the coupon. Therefore, if ten people received a targeted push notification about a sale, i.e., a flash sale alert, the coupon can differ for each of the targeted ten people. Based on the data available, the coupons are customized for each of those ten shoppers. By personalizing a sale for a customer, the customer is likely to feel rewarded, unique, and appreciated. Ultimately, this leads to additional store sales and consumers getting products and prices they want. This approach allows the store to implement customized sales rather than being limited to the standard "25% or 50% off" placards distributed about the store.

As an individual consumer continues to use the application and receive attractive discounts on desired products, the application will increase the incentive for the consumer to enter a store leveraging the application, recognizing that their previous purchasing behavior or other criteria is likely to award them with a significant discount on various items.

In addition to generating more foot traffic and sales for the store and shopping center, "brick and mortar" analytics based on data collected by the system can be provided to store or mall operators. These analytics allow each store operator or mall manager to more intelligently establish product lines, inventory and pricing.

With the application, analytics can be provided for the entire flash sale funnel process: who the flash sale alert was sent to, who viewed the flash sale alert, and who redeemed the flash sale coupon by physically going to the store. This behavioral data is valuable for stores to improve the overall shopping experience, including merchandizing, messaging, pricing, and other operational considerations.

The personalization of the flash sale alert and associated offer allows the store to control inventory, staff according to expected customer density, help employees better manage the store's operation, and create a positive customer experience. Thus, the application 10 ensures that discounting is more effective and as a result, ultimately less expensive to the retailer.

In addition to analytics associated with redeemed coupons, the application allows retailers to receive analytics based on offers, whether redeemed or not. For example, the retailer can assess how various sales are performing in one or more stores. The application allows the retailer to control who receives the offers and to see how customers interact with the offers.

Figure 9:
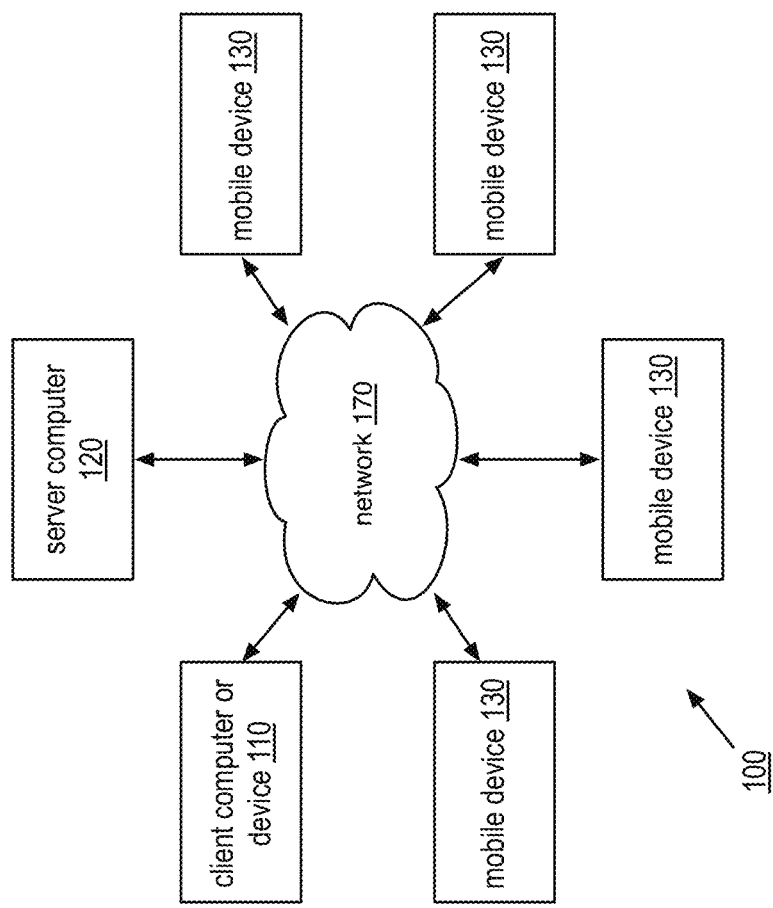
FIG. 9 is a schematic block diagram of an embodiment of a network in accordance with the present invention.

FIG. 9 illustrates a computer network or similar digital processing environment 100 in which the application may be implemented. The application is implemented across a global network, generally supported by the Internet and the World Wide Web. Client computer(s)/devices 110, server computer(s) 120 and mobile devices 130 provide processing, storage, and input/output devices for executing programs associated with the application 10. The mobile devices 130 can be linked through communications network 170 to other computing devices, including other client devices/processes 110 and server computer(s) 120. Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable. In particular, the application leverages both Wi-Fi and cellular networks for interaction.

Figure 10:
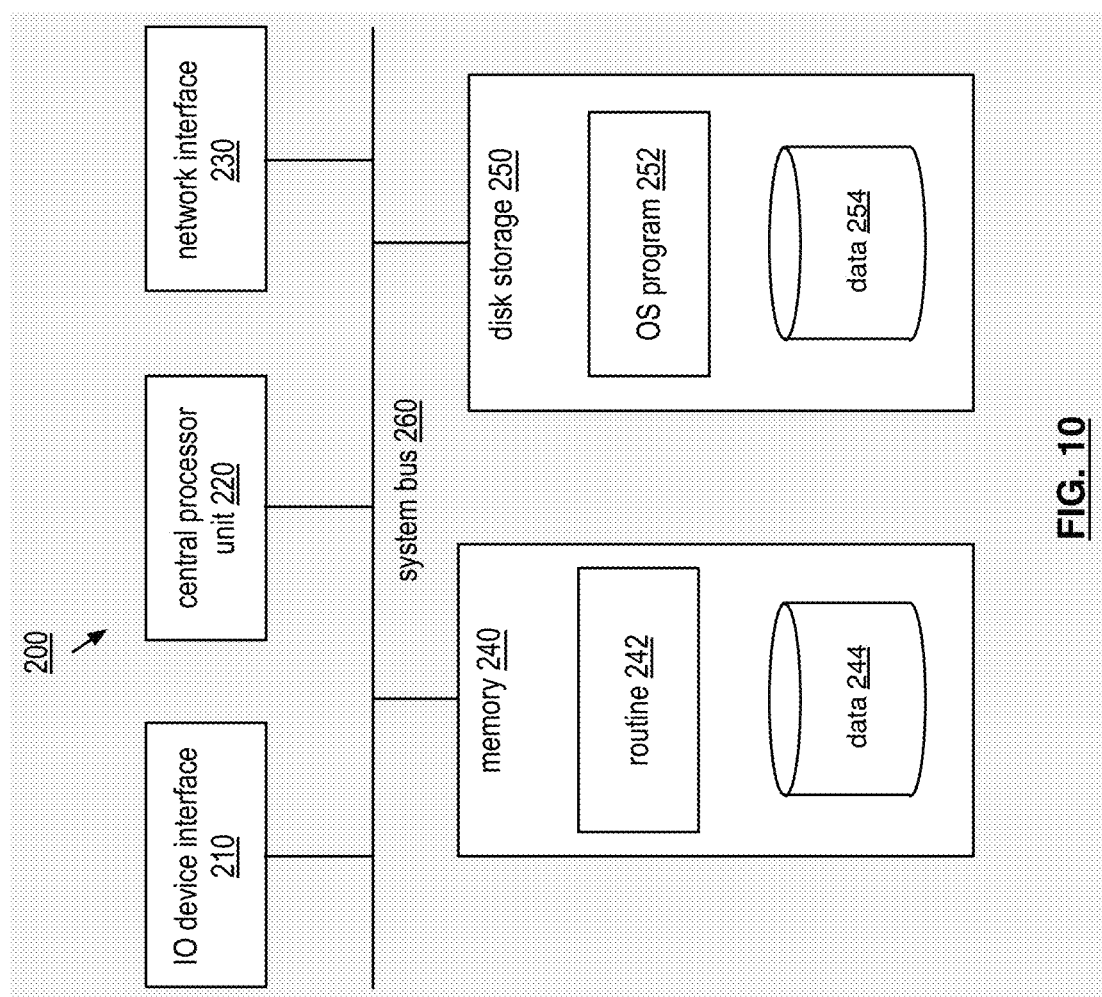
FIG. 10 is a block diagram an embodiment of a computing device in accordance with the present invention.

FIG. 10 illustrates an example of the internal structure of a device (e.g., client processor/device 110, server computers 120 or mobile devices 130 in the computer system of FIG. 6. Each device 110, 120, 130 contains a form of a system bus 260, where a bus is a set of hardware lines used for data transfer among the components of a computer or processing system. Bus 260 is essentially a shared conduit that connects different elements of a computer system (e.g., processor, disk storage, memory, input/output ports, network ports, etc.) that enables the transfer of information between the elements. Attached to system bus 260 is an Input/Output (I/O) device interface 210 for connecting various input and output devices (e.g., keyboard, mouse, displays, printers, speakers, etc.) to the devices 110, 120, 130. Network interface 230 allows the each device 110, 120, 130 to connect to various other devices attached to a network (e.g., network 170 of FIG. 6). Memory 240 provides volatile storage for computer software instructions 242 and data 244 used to implement one or more embodiments of the application and its component parts. Disk storage 250 provides non-volatile storage for computer software instructions 252 and data 254 used to implement an embodiment. Central processor unit 220 is also attached to system bus 260 and provides execution of computer instructions.

In one aspect, the processor routines 242 and data 244 are a computer program product, including a computer readable medium (e.g., a removable storage medium, such as one or more DVD-ROM's, CD-ROM's, diskettes, tapes, hard drives, etc.) that provides at least a portion of the software instructions for the application 10. Computer program product can be installed by any suitable software installation procedure, as is well known in the art. In another embodiment, at least a portion of the software instructions may also be downloaded over a cable, communication and/or wireless connection.

A data processing system suitable for storing and/or executing program code will include at least one processor 220 coupled directly or indirectly to memory elements 240 through a system bus 260. The memory elements 240 can include local memory employed during actual execution of the program code, bulk storage, and cache memories, which provide temporary storage of at least some program code in order to reduce the number of times code are retrieved from bulk storage during execution.

Input/output or I/O devices 210 (including but not limited to keyboards, displays, pointing devices, touch screens, gesture recognition interfaces, smart phones, kiosks, RFID identifiers, smart cards, etc.) can be coupled to the system either directly or through intervening I/O controllers.

Network adapters 230 may also be coupled to the system to enable the data processing system to become coupled to other data processing systems or remote printers or storage devices through intervening private or public networks. Modems, cable modem and Ethernet cards are just a few of the currently available types of network adapters.

FIG. 11 is a logic diagram of an embodiment of a method for flash sale offerings that begins at step 300 where a retail type server sends a flash sale data file to a warehouse server. The flash sale data includes information regarding identity of merchandise that is a subject of a flash sale, a duration of the flash sale, one or restrictions of the flash sale, identity of one or more targeted customers, and/or geographic proximity parameters. Note that the retail-type server is a retailer server, a retail chain server, and/or a chain store server.

In one embodiment, the information of the flash sale data file includes different sales promotions based on the location of the customer, the type of customer, the customer profile, the type of merchandize that is the subject of the flash sale. For example, the information includes a first sales price and a first time duration for the identified merchandize when the computing device is located within a store associated with the retail-type server and a second sales price and a second time duration for the identified merchandize when the computing device is located proximal to, but not within, the store associated with the retail-type server. As a more specific example, the first sales price may be higher than the second sales price to entice a potential customer to enter the store. As another more specific example, the second time duration may be long than the first time duration to allow a consumer to travel and get to the store.

As an example of generating the flash sale data file, the retail-type server determines that the computer device is in a store associated with the retail-type server. For example, the computing device has accessed the wireless local area network of the store, has received GPS information of the computing device, or some other type of location information of the computing device. The retail-type server then accesses profile data of a customer associated with the computing device. The profile data includes customer name, customer's purchase history with the store, customer's product likes and dislikes, and/or another data regarding the purchasing habits of the customer. Based on the profile data, the retail-type server generates the flash sale data file specifically for the computing device, which may be sent directly to the computing device and/or to the warehouse server.

As an example of generating the flash sale data file, the computing device, that the computing device determines that it is geographically proximal to a store associated with the retail-type server. For instance, the computing device determines that it is in the store, in a mall that contains the store, is within x miles of the store, etc. When the computing device is geographically proximal to the store, it transmits a request for the flash sale. The request may be transmitted to the warehouse server 18 and/or to the retail-type server.

When the request is transmitted to the warehouse server, it forwards the request to the retail-type server. The retail-type server processes the request for the flash sale based profile data of a customer associated with the computing device. When the processing yields a favorable response, the retail-type server generates the flash sale data file for the computing device. For example, if the customer associated with the computing device is a preferred customer, the retail-type server generates the flash sale data file. As another example, if the customer associated with the computing device is a new potential customer, the retail-type server generates the flash sale data file. As yet a further example, if the merchandize for which the flash sale is requested is not selling well, then the retail-type server generates the flash sale data file.

The method continues at step 302 where the warehouse sever stores the flash sale data file in a database that functions as a virtual warehouse of flash sales. The storing includes verifying the retail type server, verifying the flash sale data file, and when valid storing the flash sale data file in a database of a virtual warehouse of flash sales. The method continues at step 304 where the warehouse server interprets the information of the flash sale data file to determine flash sale parameters. For example, the warehouse sever determines the time frame for the sale, requirements for location of targeted customers (e.g., in store only), minimum customer attributes for targeted customers, a specific customer, etc.

The method continues at step 306 where the warehouse server determines whether a computing device has customer-device data that corresponds to the flash sale parameters. For example, the customer meets the minimum customer attributes and the computing device meets the location requirements. If not 308, the method continues at step 310 where the warehouse server determines whether another computing device has customer-device data corresponding to the parameters. The warehouse sever will continue this loop until all potential customers have been exhausted, until time expires on the flash sale, until a desired number of customers have been identified, until a total number of customers have been processed, and/or any other criteria to end the method.

For each customer identified, the method continues at step 312 where the warehouse server generates a customer specific coupon regarding the flash sale. For example, the warehouse server generates a digital coupon for a specific customer. As another example, the warehouse server generates a digital coupon for a group of customers having like attributes. The method continues at step 314 where the warehouse server transmits the customer specific coupon to the computing device.

The method continues at step 316 where the computing device stores the customer specific coupon. The method continues at step 318 where the computing device transmits a redeem message regarding the customer specific coupon to the retail-type server. The redeem message may be sent directly to the retail-type server or via the warehouse server.

The method continues at step 320 where the retail-type server processes the redeem message. For example, the retail-type server determines whether the coupon is still valid, whether the offer reflected by the coupon has been changed, whether the customer is one of the targeted customers, whether the flash sale is valid with other offers, and/or any other data processing to verify the flash sale and executed a sale of the corresponding merchandize. The process further includes determining whether the flash sale has been exhausted (e.g., time expired, a desired number of customers have used the corresponding coupon, etc.). If not, the process repeats at step 310.

When the processing of the redeem message results in a purchase of the identified merchandize and the flash sale is exhausted, the method continues at step 324 where the retail-type server sends a delete message to the warehouse server, wherein the delete message instructs the warehouse server to delete the flash sale data file. The method continues at step 326 where the warehouse server deletes the flash sale data file in accordance with the delete message. Note that the warehouse server may keep an archive of the flash sale data file.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a warehouse server of a flash sale network, a flash sale data file from a retail-type server, wherein the flash sale data file includes information regarding identity of merchandise that is a subject of a flash sale and one or more of a duration of the flash sale, one or more restrictions of the flash sale, geographic proximity parameters, and an identity of one or more targeted customers;
   verifying, by the warehouse server, the retail-type server by verifying one or more of a retailer's name, a retailer's account, a retailer's personal identification number, a retailer's payment account information, the retail-type server's internet protocol address, the retail-type server's serial number, and the retail-type server's warehouse network identification;
   when the retail-type server is verified, storing, by the warehouse server, the flash sale data file in a database that functions as a virtual warehouse of flash sales;
   interpreting, by the warehouse server, the information of the flash sale data file to determine flash sale parameters;
   determining, by the warehouse server, whether a computing device has customer-device data that corresponds to the flash sale parameters;
   when the computing device has the customer-device data that corresponds to the flash sale parameters:
   generating, by the warehouse server, a customer specific coupon for the identified merchandize regarding the flash sale in accordance with the flash sale parameters, wherein the identified merchandize has a retail price, wherein the customer specific coupon has a first sales price and a first time duration when the computing device is located within a store associated with the retail-type server and has a second sales price and a second time duration for the identified merchandize when the computing device is located proximal to, but not within, the store associated with the retail-type server, and wherein the first and second sales prices are less than the retail price; and
   transmitting, by warehouse server, the customer specific coupon to the computing device.

2. The method of claim 1 further comprises:
   storing, by the computing device, the customer specific coupon;
   transmitting, by the computing device, a redeem message regarding the customer specific coupon to the retail-type server;
   processing, by the retail-type server, the redeem message;
   when the processing of the redeem message results in a purchase of the identified merchandize, sending, by the retail-type server, a delete message to the warehouse server, wherein the delete message instructs the warehouse server to delete the flash sale data file; and
   deleting, by the warehouse server, the flash sale data file in accordance with the delete message.

3. The method of claim 1, wherein the determining whether the computing device has customer-device data that corresponds to the flash sale parameters comprises one or more of:

determining that the identified merchandize is a type of product that a customer associated with the computing device is likely to purchase;

determining that the customer associated with the computing device is a preferred customer;

determining that the customer associated with the computing device is a potential new customer; and determining that the computing device is compliant with the one or more restrictions of the flash sale.

4. The method of claim 1 further comprises:

determining, by the retail-type server, that the computer device is in the store associated with the retail-type server;

accessing, by the retail-type server, profile data of a customer associated with the computing device; and based on the profile data, generating, by the retail-type server, the flash sale data file specifically for the computing device.

5. The method of claim 1 further comprises:

determining, by the computing device, that the computing device is geographically proximal to the store associated with the retail-type server;

when the computing device is geographically proximal to the store, transmitting, by the computing device, a request for the flash sale;

processing, by the retail-type server, the request for the flash sale, based profile data of a customer associated with the computing device; and when the processing yields a favorable response, generating, by the retail-type server, the flash sale data file for the computing device.

6. The method of claim 1, wherein the retail-type server comprises one or more of:

a retailer server;

a retail chain server; and a chain store server.

7. A non-transitory computer readable storage device comprises:

a first storage section that stores operational instructions that, when executed by a warehouse server of a flash sale network, causes the warehouse server to:

receive a flash sale data file from a retail-type server, wherein the flash sale data file includes information regarding identity of merchandise that is a subject of a flash sale and one or more of a duration of the flash sale, one or more restrictions of the flash sale, geographic proximity parameters, and an identity of one or more targeted customers;

a second storage section that stores operational instructions that, when executed by the warehouse server, causes the warehouse server to:

verifying, by the warehouse server, the retail-type server by verifying one or more of a retailer's name, a retailer's account, a retailer's personal identification number, a retailer's payment account information, the retail-type server's internet protocol address, the retail-type server's serial number, and the retail-type server's warehouse network identification; when the retail-type server is verified, store the flash sale data file in a database that functions as a virtual warehouse of flash sales;

interpret the information of the flash sale data file to determine flash sale parameters;

determine whether a computing device has customer-device data that corresponds to the flash sale parameters; and when the computing device has the customer-device data that corresponds to the flash sale parameters, generate a customer specific coupon for the identified merchandize regarding the flash sale in accordance with the flash sale parameters, wherein the identified merchandize has a retail price, wherein the customer specific coupon has a first sales price and a first time duration when the computing device is located within a store associated with the retail-type server and has a second sales price and a second time duration for the identified merchandize when the computing device is located proximal to, but not within, the store associated with the retail-type server, and wherein the first and second sales prices are less than the retail price; and a third storage section that stores operational instructions that, when executed by the warehouse server, causes the warehouse server to:

transmit the customer specific coupon to the computing device.

8. The non-transitory computer readable storage device of claim 7 further comprises:

a fourth storage section that stores operational instructions that, when executed by the computing device, causes the computing device to:

store the customer specific coupon;

transmit a redeem message regarding the customer specific coupon to the retail-type server;

a fifth storage section that stores operational instructions that, when executed by the retail-type server, causes the retail-type server to:

process the redeem message;

when the processing of the redeem message results in a purchase of the identified merchandize, send a delete message to the warehouse server, wherein the delete message instructs the warehouse server to delete the flash sale data file; and a sixth storage section that stores operational instructions that, when executed by the warehouse server, causes the warehouse server to:

delete the flash sale data file in accordance with the delete message.

9. The non-transitory computer readable storage device of claim 7, wherein the second storage section further stores operational instructions that, when executed by the warehouse server, causes the warehouse server to determine whether the computing device has customer-device data that corresponds to the flash sale parameters by one or more of:

determining that the identified merchandize is a type of product that a customer associated with the computing device is likely to purchase;

determining that the customer associated with the computing device is a preferred customer;

determining that the customer associated with the computing device is a potential new customer; and determining that the computing device is compliant with the one or more restrictions of the flash sale.

10. The non-transitory computer readable storage device of claim 7 further comprises:

a fourth storage section that stores operational instructions that, when executed by the retail-type server, causes the retail-type server to:

determine that the computer device is in the store associated with the retail-type server;

access profile data of a customer associated with the computing device; and based on the profile data, generate the flash sale data file specifically for the computing device.

11. The non-transitory computer readable storage device of claim 7 further comprises:
 a fourth storage section that stores operational instructions that, when executed by the computing device, causes the computing device to:
  determine that the computing device is geographically proximal to the store associated with the retail-type server; and
  when the computing device is geographically proximal to the store, transmit a request for the flash sale; and
 a fifth storage section that stores operational instructions that, when executed by the retail-type server, causes the retail-type server to:
  process the request for the flash sale, based profile data of a customer associated with the computing device; and
  when the processing yields a favorable response, generate the flash sale data file for the computing device.

12. The non-transitory computer readable storage device of claim 7, wherein the retail-type server comprises one or more of:
 a retailer server;
 a retail chain server; and
 a chain store server.

* * * * *